United States Patent
Muraco et al.

[11] 3,889,293
[45] June 10, 1975

[54] RADAR RECORDING AND REPRODUCING SYSTEM WITH PULSE MODULATION AND TIME DIVISION MULTIPLEXING

[75] Inventors: Paul F. Muraco, Turnersville; James S. Griffin, Medford, both of N.J.

[73] Assignee: The United States of America as represented by the Secretary of the Navy, Washington, D.C.

[22] Filed: Mar. 5, 1973

[21] Appl. No.: 338,120

[52] U.S. Cl. ............. 360/18; 343/5 PC; 178/6.8
[51] Int. Cl. ............................................. G11b 5/02
[58] Field of Search...... 343/5 PC, 5 SC; 178/6.6 A, 178/6.8, 6; 360/23, 24, 18; 358/13

[56] References Cited
UNITED STATES PATENTS

| | | | |
|---|---|---|---|
| 2,863,227 | 12/1958 | Chubb | 178/6.6 A |
| 3,191,169 | 6/1965 | Shulman | 343/5 SC |
| 3,403,221 | 9/1968 | Van Den Bussche | 178/6.6 A |
| 3,435,135 | 3/1969 | Yasuoka | 178/6.6 A |
| 3,444,553 | 5/1969 | Tsumura | 343/5 PC |
| 3,588,896 | 6/1971 | Duarte | 343/5 PC |
| 3,653,044 | 3/1972 | Breeze | 343/5 SC |
| 3,716,853 | 2/1973 | La Follette | 343/5 PC |
| 3,725,912 | 4/1973 | Buchholz | 343/5 PC |
| 3,760,413 | 9/1973 | Fielding | 343/5 SC |
| 3,760,416 | 9/1973 | Barriere | 343/5 PC |
| 3,761,611 | 9/1973 | Nakamura | 178/6.6 A |

*Primary Examiner*—Bernard Konick
*Assistant Examiner*—Alan Faber
*Attorney, Agent, or Firm*—R. S. Sciascia; Henry Hansen

[57] ABSTRACT

A record and reproduction system for a forward-looking radar. Video, blanking, horizontal and vertical deflection signals are recorded directly from a radar receiver on a single wideband tape track. A composite signal of the radar receiver information is formed by pulse width modulating the deflection signals which are time multiplexed into the blanking interval preceding the video signal. On playback, the composite signal is demultiplexed and the video and deflection signals recovered for direct radar display of in-flight data.

11 Claims, 3 Drawing Figures

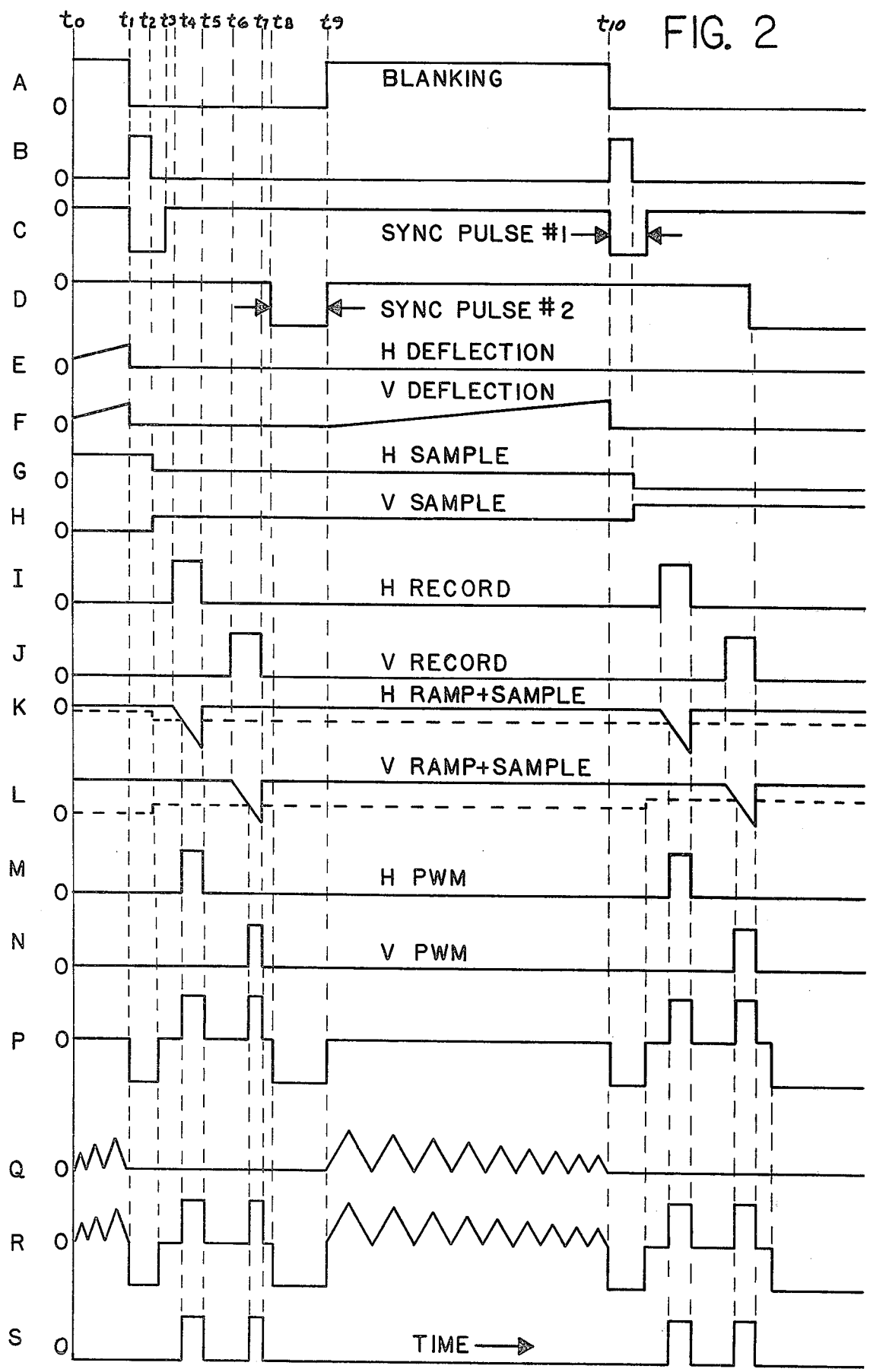

3,889,293

RADAR RECORDING AND REPRODUCING SYSTEM WITH PULSE MODULATION AND TIME DIVISION MULTIPLEXING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to a radar recording system and more particularly to a system wherein all of the signals necessary for an exact reproduction of a radar display are recorded directly from a radar receiver on a single wideband channel of magnetic tape and faithfully reproduced in playback.

Prior methods of obtaining radar information recording and reproductions have been accomplished by recording an information display on hard copy photography, motion picture film, and standard TV cameras; then displaying this information on a CRT monitor. Recording techniques have also been utilized wherein different tracks of a magnetic tape separately record video, range, and azimuth information. Other methods required the video information to be transformed to a pulse modulated representation. In all of the above methods, reproduction is degraded or complicated by the additional reproduction steps required, inherent poor time stability between recordings made by multi-track processing or additional equipment requirements for pulse encoding of video signals.

SUMMARY OF THE INVENTION

Accordingly, it is an object of the present invention to provide a completely self-contained radar information recording system wherein the video, blanking pulse, and horizontal and vertical deflection signals are recorded directly from the radar receiver onto a single wideband track of magnetic tape and faithfully reproduced in playback without the use of any visual scanning devices.

Briefly, this and other objects are accomplished by encoding the horizontal (H) and vertical (V) deflection signals of the radar receiver using pulse width modulation (PWM) techniques and then to time division multiplex the encoded data in the blanking interval preceding the analog video information. The blanking pulse is used as an asynchronous clock to generate the timing signals used in the multiplexing schemes and is identified by the generation of a sync pulse at the beginning and end of the blanking interval. A composite signal comprising the analog video information, blanking pulse, and pulse width modulated H and V deflection signals is recorded on a single wideband channel of a magnetic tape using transverse scan FM recording techniques.

In the reproduction process, the composite signal recovered from the tape track is demultiplexed. The blanking pulse is regenerated from the sync pulses and is used to generate the necessary timing signals. The pulse width modulated H and V deflection signals are separated and decoded with the H and V analog signal envelopes being recovered. These analog signals are then used to drive bipolar linear ramp generators which regenerate the analog H and V deflection signals. The blanking pulse is used to time the deflection signals and gate out the radar video information from the composite signal. The four outputs comprising the reconstructed deflection signals, radar video, and the blanking pulse are then interfaced with a radar display thereby producing an exact reproduction.

For a better understanding of these and other aspects of the invention, reference may be made to the following detailed description taken in conjunction with the accompanying drawings.

BRIEF DESCRIPTION OF THE DRAWINGS

FIG. 2 is a waveform diagram depicting signals generated during the recording and playback process.

DESCRIPTION OF A PREFERRED EMBODIMENT

Figure 1:
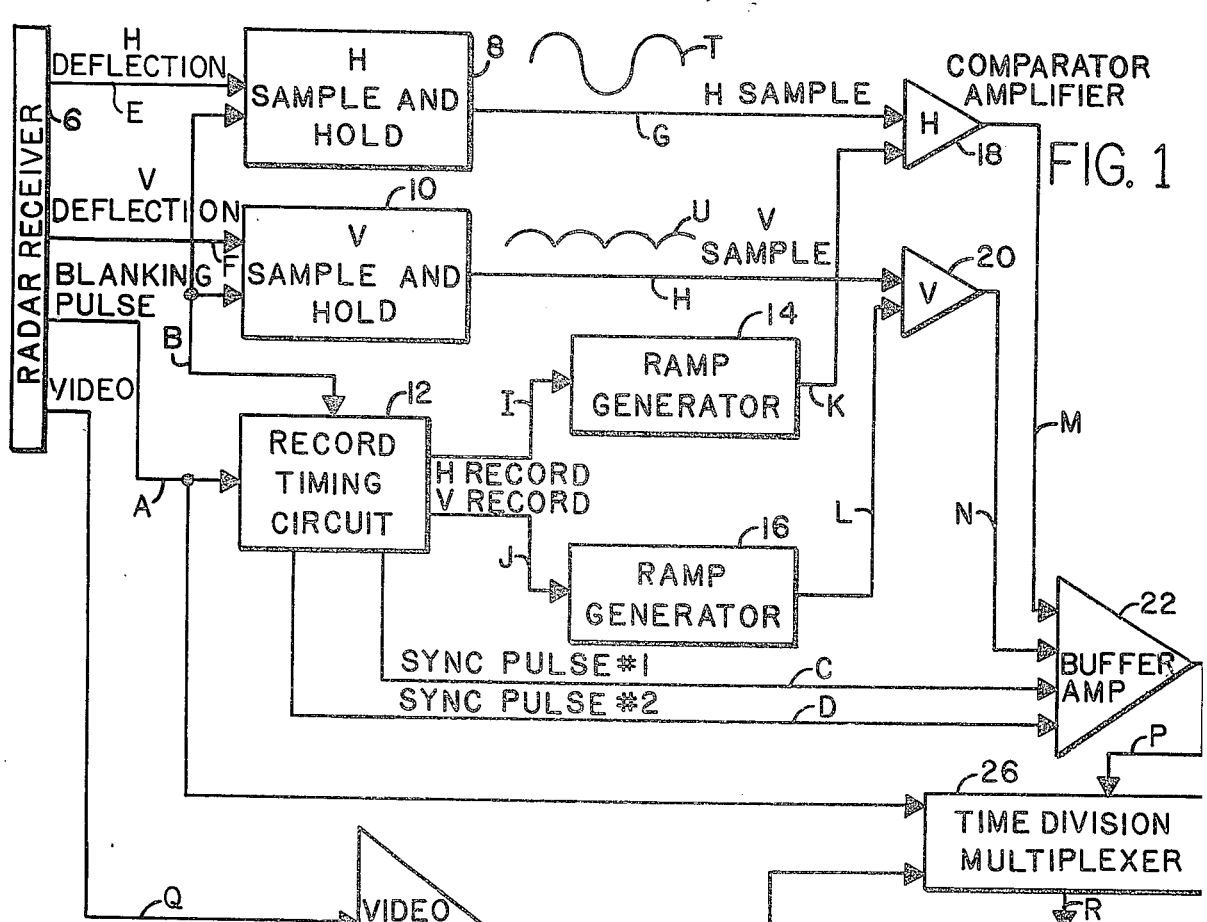
FIG. 1 is a block diagram of the recording section of the system.

Referring now to FIG. 1 there is shown a radar receiver 6 of conventional design with a CRT display having information output signals of horizontal (H) deflection, vertical (V) deflection, blanking pulse and video. An H-sample and hold circuit 8 is connected to receive the H-deflection output signals and a V-sample and hold circuit 10 is connected to receive the V-deflection output signals. The sample and hold circuits 8 and 10 are of common design well-known to those skilled in the art and function to periodically sample an input level at a given time and to hold an output at the sampled level until the next sampling period. A preprogrammed record timing circuit 12 is connected to receive the blanking pulse and provides output signals of sync pulse No. 1, sync pulse No. 2, H-record pulse, V-record pulse and sampling pulses to both the H-sample and hold circuit 8 and the V-sample and hold circuit 10. Ramp generators 14 and 16 receive the H-record pulse and V-record pulse and provide ramp outputs to H- and V-comparative amplifiers 18 and 20 respectively. A buffer amplifier 22 is parallelly connected to receive the outputs of both the comparator amplifiers 18, 20 and sync pulses No. 1 and No. 2 from the record timing circuit 12. A video amplifier 24 is adapted to receive the video signal from the radar receiver 6. A time division multiplexer 26 is connected to receive the outputs from the buffer amplifier 22, video amplifier 24, the blanking pulse from the radar receiver 6 and, provides a composite video signal output to a tape recorder 27.

Figure 3:
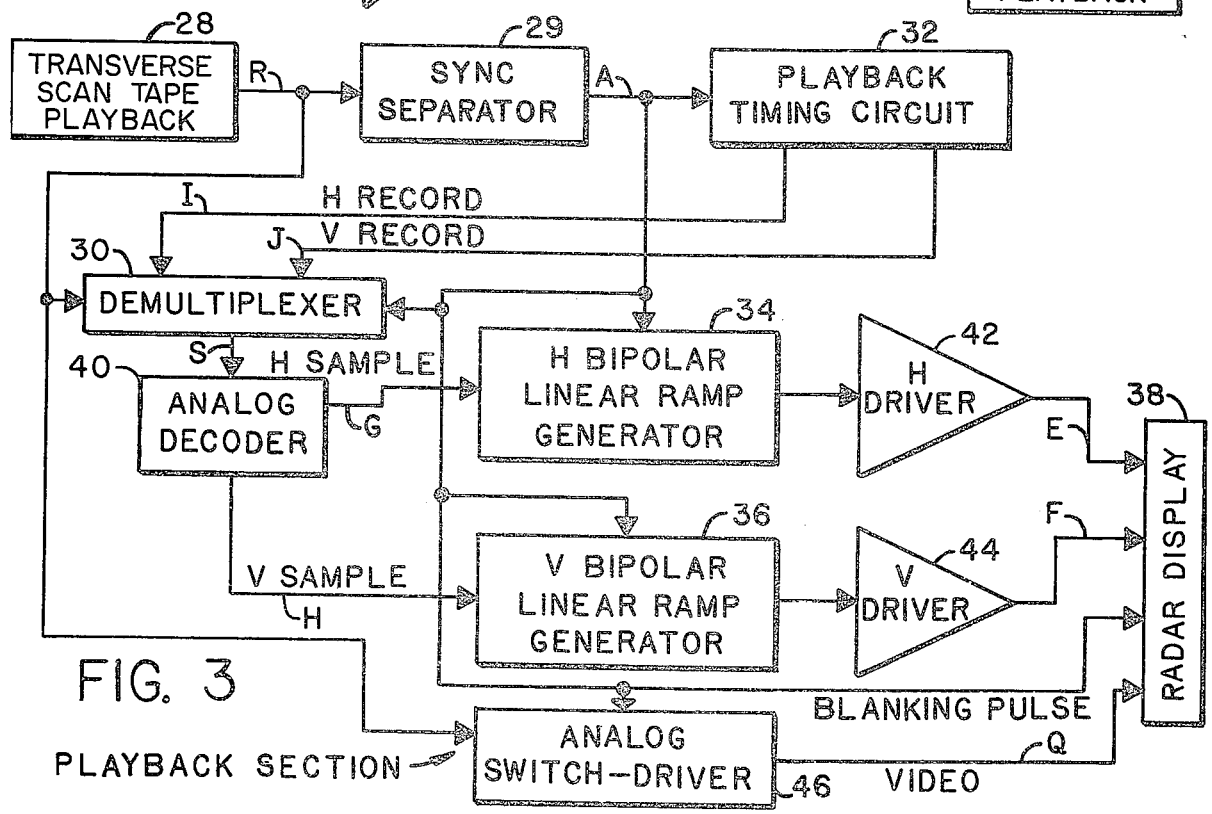
FIG. 3 is a block diagram of the playback section of the system.

Referring now to FIG. 3, there is shown a tape playback 28 having an output simultaneously connected to sync separator 29, demultiplexer 30 and analog switch/driver 46. The sync separator 29 provides a blanking pulse output which is simultaneously connected to the input of a playback timing circuit 32, the demultiplexer 30, H-bipolar linear ramp generator 34, V-bipolar linear ramp generator 36, analog switch/driver 46 and radar display 38. An analog decoder 40 is connected to receive an input from the demultiplexer 30 and provides a first output connected to the H bipolar linear ramp generator 34 and a second output connected to the V-bipolar linear ramp generator 36. H-driver 42 is connected to receive the output of the ramp generator 34 and provides an output connected to the radar display 38. Similarly, V-driver 44 is connected to receive the output of the ramp generator 36 and provides an output connected to radar display 38.

Referring now to FIG. 2 in conjunction with FIG. 1, the operation of the recording system will be described. CRT display circuits in the radar receiver 6 transmit a blanking pulse to the record timing circuit 12. This pulse is shown in waveform A of FIG. 2 and is delineated by the time interval $t_1$ to $t_9$. The record timing circuit 12 is preprogrammed to apportion the blanking pulse into four distinct subintervals shown in FIG. 2 as sync pulse No. 1 in waveform C extending from $t_1$ to $t_3$, H-record pulse in waveform I extending from $t_4$ to $t_5$, V-record pulse in waveform J extending from $t_6$ to $t_7$ and sync pulse No. 2 shown in waveform D extending from $t_8$ to $t_9$. A record sample pulse is generated at the beginning of the blanking interval as shown in waveform B, $t_1$ to $t_2$, and the record timing circuit 12 simultaneously transmits this pulse to the H-sample and hold circuit 8 and the V-sample and hold circuit 10. The H-deflection signal shown in waveform E forms one input to the H-sample and hold 8 and the V-deflection signal shown in waveform F forms an input to the V-sample and hold 10. A value proportional to the respective H- and V-sweep amplitudes at the time of sampling is retained in the sample and hold circuits 8 and 10 until the next sampling pulse. Waveforms G and H respectively show signal levels representative of the sampled values of the H- and V-deflection signals. The sampled values will change levels with each new blanking pulse and over a relatively large number of sample pulses will form signal envelopes as shown in the compressed horizontal waveform envelope T and vertical waveform envelope U. The compressed signal envelopes T and U will have a cyclic rate determined by the sweep rate of the radar receiver antenna (not shown). After the samples are taken of the H- and V-deflection amplitudes, the record timing circuit 12 transmits an H record pulse I and a V-record pulse J which define the time periods available for the coding of the horizontal and vertical deflection signals. The H-record pulse functions to start and stop the ramp generator 14 which output as shown in waveform K forms one input to the H-comparator amplifier 18. The V-record pulse functions to start and stop the ramp generator 16 which output as shown in waveform L forms one input to the V-comparator amplifier 20. The H-comparator amplifier 18, which operates as a horizontal sweep modulator, has a second input which receives the signal level G that is stored in the H-sample and hold circuit 8. The V-comparator amplifier 20, which operates as a vertical sweep modulator, has a second input which receives the signal level H that is stored in the V-sample and hold circuit 10. The H-comparator amplifier 18 produces a PWM signal as shown in waveform M which has one edge fixed in time by the intersection of the ramp generated by ramp generator 14 and the H-sample and the other edge determined by the end of the H-record pulse. Waveform K shows the H-sample value (dotted horizontal lines) imposed on the output of the ramp generator 14. At the time of intersection of the dotted line (H-sample) with the H-ramp, the H-pulse in waveform M begins. The end of the H-record pulse in waveform I terminates both the H-ramp and the H PWM signal in waveform M. The vertical deflection signal is similarly pulse width modulated as shown in waveforms J, L and N. Since the comparator amplifier 18 will provide a constant amplitude output for a time depending upon the slope of the ramp input intersecting with the value stored in the H-sample and hold circuit 8, it is seen that the width of the pulse M is proportional to the sampled amplitude of the horizontal sweep. The buffer amplifier 22 sequentially receives the four inputs representing sync pulse No. 1, pulse width modulated horizontal deflection, pulse width modulated vertical deflection and sync pulse No. 2, respectively. These four input signals are sequenced and amplified as shown in waveform P, extending from $t_1$ to $t_9$. The video amplifier 24 receives a low level analog video signal from the radar receiver 6 as shown in waveform Q and amplifies the signal to a level suitable for further processing and recording. The time division multiplexer 26 receives outputs from the buffer amplifier 22, the video amplifier 24 and the blanking pulse as shown in waveform A. The analog video signal is then time multiplexed with the deflection and sync information supplied by the buffer amplifier 22 and is inserted during the nonblanking time when the deflection sweeps are inactive corresponding to the interval $t_9$ to $t_{10}$ as shown in waveform R. Waveform R shows the composite video signal that is recorded upon a single wideband track of magnetic tape in tape recorder 27. All of the information necessary for an exact reproduction of the data originally displayed on the CRT of the radar receiver 6 is contained within this composite video signal. That is, waveform R shows a first sync pulse extending from $t_1$ to $t_3$, pulse width modulated horizontal sweep information, pulse width modulated vertical sweep information, a second sync pulse $t_8$ to $t_9$ and analog video $t_9$ to $t_{10}$.

This composite video signal is now properly configured for recording upon a single wideband tape track by transverse scan methods.

Referring now to FIG. 3 in conjunction with FIG. 2, the operation of the playback section of the system will be explained. The composite video signal as shown in waveform R is taken from the single wideband tape track by tape playback unit 28 and simultaneously routed to the sync separator 29, demultiplexer 30 and analog switch/driver 46. The sync separator 29 detects sync pulse No. 1 and sync pulse No. 2 and has an output as shown in waveform A which regenerates the original blanking pulse. The playback timing circuit 32 receives the blanking pulse from sync separator 29 and is preprogrammed to provide a first output signal representative of the original H-record pulse shown in waveform I and a second output signal representative of the original V-record pulse shown in waveform J.

These H- and V-record pulses are routed to the demultiplexer 30 which strips off the pulse width modulated deflection signals from the composite video as shown in waveform S. The analog decoder 40 receives the demultiplexed sweep information and separates this information into H- and V-analog signals as shown in waveforms G and H respectively. The analog decoder 40 accepts the PWM H- and V-pulses and transforms these pulses to analog voltage levels which are proportional to the width of the received pulse. Over a sufficient number of sampling periods, the decoded analog levels will assume the original H- and V-envelope signals as depicted in FIG. 1, waveforms T and U. The first bipolar linear ramp generator 34 receives the analog H-signal and the blanking pulse for maintaining correct timing of the horizontal sweep processing circuits. The leading edge of the blanking pulse triggers the generation of a bipolar linear ramp which continues to endure for the entire length of the unblanking interval. The decoded H-analog level intersects the ramp and provides an output level that has been charged to a particular voltage. Succeeding horizontal sweep voltages are generated according to the frequency of the blanking pulse. The H-driver 42 receives the charged level of horizontal sweep voltage from the ramp generator 34 and amplifies the received voltage to a level as shown in waveform E sufficient to drive the horizontal sweep circuits of radar display 38. Similarly, the second bipolar linear ramp generator 36 receives the V-analog level signal and the blanking pulse for maintaining correct timing of the vertical sweep processing circuits. The leading edge of the blanking pulse triggers the generation of a bipolar linear ramp which continues to endure for the entire duration of the unblanking interval. The decoded V-analog level intersects the ramp and provides an output level that has then charged to a particular voltage. Succeeding vertical sweep voltages are generated according to the frequency of the blanking pulse. The V-driver 44 receives the charged level of the vertical sweep voltage from the ramp generator 36 and amplifies the received voltage to a level as shown in waveform F sufficient to drive the vertical sweep circuit of radar display 38. The sync separator 29 provides the blanking pulse to the radar display 38 and to the analog switch/driver 32. The analog switch/driver 32 receives the composite video signal R and switches only the analog video portion of the composite video signal to a driving circuit which raises the video signal to a level as shown in waveform Q sufficient for driving the video circuits of the CRT in the radar display 38. It should now be apparent that the radar display 38 has received all of the prior recorded radar information signals necessary for CRT reproduction of the originally displayed information.

Thus it may be seen that there has been provided a novel device for directly recording radar information on a single wideband track of magnetic tape and faithfully reproducing the information on a radar display without the use of visual scanning interface equipment.

Obviously many modifications and variations of the invention are possible in light of the above teachings. It is therefore to be understood that within the scope of the appended claims the invention may be practiced otherwise than as specifically described.

What is claimed is:

1. In a single track magnetic tape recording/reproducing system, a signal processor for combining and separating CRT information including video, horizontal and vertical deflection signals, and blanking pulse, comprising:
    combining means for receiving the CRT information wherein the horizontal and vertical deflection signals are encoded in pulse width modulation form during the blanking period and time-multiplexed with the video during the nonblanking period to form a composite output signal for recording on the single track tape; and
    separating means connected to receive the composite output signal on the tape for recovering the blanking pulse, deflection and video signals.

2. A signal processor according to claim 1 wherein said combining means further comprises:
    timing means formed to receive the blanking pulse for providing a sampling pulse, horizontal and vertical record pulses, and sync pulses;
    encoding means formed to receive the horizontal and vertical deflection signals and connected to receive the sampling pulse and the record pulses for encoding the deflection signals into pulse width modulation form and for providing horizontal and vertical pulse width signals proportional to the amplitude of the horizontal and vertical deflection signals;
    buffer means connected to receive the sync pulses and the horizontal and vertical pulse width signals and for providing a serial output signal; and
    multiplexing means formed to receive the video and blanking pulse and connected to receive the serial output signal for providing the composite signal.

3. A signal processor according to claim 2 wherein said separating means further comprises:
    timing means formed to receive the composite signal for regenerating the blanking pulse and the record pulses;
    demultiplexing means formed to receive the composite signal, and connected to receive the regenerated blanking pulse and the record pulses for separating the horizonal and vertical pulse width signals from the composite signal;
    decoding means connected to receive the separated horizontal and vertical pulse width signals for providing decoded analog signals thereof;
    deflection signal generating means connected to receive the regenerated blanking pulse and decoded analog signals for regenerating the horizontal and vertical deflection signals; and
    switching means formed to receive the composite signal and connected to receive the regenerated blanking pulse for passing the video.

4. In a single track magnetic tape recording system, a signal processor for combining CRT information including video, horizontal and vertical deflection signals, and blanking pulse, comprising:
    timing means formed to receive the blanking pulse and for providing a sampling pulse, horizontal and vertical record pulses, and sync pulses;
    encoding means formed to receive the horizontal and vertical deflection signals and connected to receive the sampling pulse and the record pulses for encoding the deflection signals into pulse width modulation form and for providing horizontal and vertical pulse width signals proportional to the amplitude of the horizontal and vertical deflection signals;
    buffer means connected to receive the sync pulses and the horizontal and vertical pulse width signals and for providing a serial output signal; and
    time multiplexing means formed to receive the video and blanking pulse and connected to receive the serial output signal for providing a composite signal having the serial output signal for recording during blanking time and the video for recording during nonblanking time.

5. A signal processor according to claim 4 wherein the sampling pulse, horizontal and vertical record pulses, and the sync pulses provided by said timing means are produced during the blanking time.

6. A signal processor according to claim 5 wherein the encoding means further comprises:
    a horizontal sample and hold circuit formed to receive the horizontal deflection signal and connected to receive the sampling pulse for providing a horizontal sample pulse which amplitude is representative of the sampled level of the horizontal deflection signal;

a vertical sample and hold circuit formed to receive the vertical deflection signal and connected to receive the sampling pulse for providing a vertical sample pulse which amplitude is representative of the sampled level of the vertical deflection signal;

a first ramp generator connected to receive the horizontal record pulse for generating a horizontal ramp signal;

a second ramp generator connected to receive the vertical record pulse for generating a vertical ramp signal;

a first comparator amplifier connected to receive the horizontal sample pulse and the horizontal ramp signal for providing the horizontal pulse width signal; and a second comparator amplifier connected to receive the vertical sample pulse and the vertical ramp signal for providing the vertical pulse width signal.

7. A signal processor according to claim 6 wherein said recording is accomplished utilizing frequency modulation with transverse scan of said magnetic tape.

8. In a single track magnetic tape playback system, a signal processor for separating a composite signal of CRT information including video, horizontal and vertical pulse width signals, and sync pulses, comprising:

timing means formed to receive the composite signal of the CRT information for regenerating a first output representative of a blanking pulse and a second output representative of horizontal and vertical record pulses;

time demultiplexing means formed to receive the composite signal, and connected to receive the regenerated blanking pulse and the record pulses for separating the horizontal and vertical pulse width signals from the composite signal during the CRT blanking time;

decoding means connected to receive the separated horizontal and vertical pulse width signals for providing decoded analog signals thereof;

deflection signal generating means connected to receive the regenerated blanking pulse and decoded analog signals for regenerating horizontal and vertical deflection signals; and switching means formed to receive the composite signal and connected to receive the regenerated blanking pulse for passing the video during the CRT nonblanking time.

9. A signal processor according to claim 8 wherein said timing means further comprises:

a sync separator formed to receive the composite signal and responsive to the reception of the sync pulses for providing the regenerated blanking pulse; and a playback timing circuit connected to receive the output of said sync separator for providing the record pulses.

10. A signal processor according to claim 9 wherein said deflection signal generating means further comprises:

a first bipolar ramp generator connected to receive the regenerated blanking pulse and the decoded analog horizontal signal for generating a horizontal ramp signal proportional to the level of the decoded analog horizontal signal;

a second bipolar ramp generator connected to receive the regenerated blanking pulse and the decoded analog vertical signal for generating a vertical ramp signal proportional to the level of the decoded analog vertical signal;

a horizontal deflection driver connected to receive the horizontal ramp signal for providing an amplified horizontal output signal; and a vertical deflection driver connected to receive the vertical ramp signal for providing an amplified vertical output signal.

11. A signal processor as described in claim 10 wherein said playback is accomplished utilizing frequency modulation detection with transverse scan of said magnetic tape.

* * * * *